(12) United States Patent
Walker et al.

(10) Patent No.: US 6,953,498 B2
(45) Date of Patent: Oct. 11, 2005

(54) ADSORPTION GAS DRYER

(75) Inventors: Brian Walker, Hexham (GB); Richard Lawrence Taggart, Chester-Le-Street (GB)

(73) Assignee: Walker Filtration Limited (GB)

( * ) Notice: Subject to any disclaimer, the term of this patent is extended or adjusted under 35 U.S.C. 154(b) by 96 days.

(21) Appl. No.: 10/611,957

(22) Filed: Jul. 3, 2003

(65) Prior Publication Data

US 2004/0020366 A1 Feb. 5, 2004

(30) Foreign Application Priority Data

Jul. 5, 2002 (GB) .............................................. 0215649

(51) Int. Cl.[7] .......................... B01D 53/04; B01D 53/26
(52) U.S. Cl. ............................. 96/130; 95/121; 96/133; 96/143; 96/153
(58) Field of Search ........................ 95/117, 121, 122; 96/130–133, 143–145

(56) References Cited

U.S. PATENT DOCUMENTS

| | | | |
|---|---|---|---|
| 3,080,977 A | * 3/1963 | Jones ......................... | 210/232 |
| 4,512,781 A | 4/1985 | Caralli et al. | |
| 4,687,573 A | 8/1987 | Miller et al. | |
| 4,846,211 A | * 7/1989 | Scheffler et al. ....... | 137/119.01 |
| 4,877,429 A | * 10/1989 | Hunter ........................ | 95/95 |
| 5,174,798 A | * 12/1992 | Luby ........................... | 422/122 |
| 5,286,282 A | * 2/1994 | Goodell et al. ............... | 96/113 |
| 5,344,474 A | * 9/1994 | Null ............................. | 55/344 |
| 5,827,354 A | * 10/1998 | Krabiell et al. ............... | 95/96 |
| 5,961,698 A | 10/1999 | Dossaji et al. | |
| 6,036,754 A | 3/2000 | Rowe | |
| 6,096,115 A | * 8/2000 | Kleinberg et al. ........... | 95/101 |
| 6,200,365 B1 | 3/2001 | Eimer et al. | |
| 6,581,297 B1 | * 6/2003 | Ginder ......................... | 34/79 |
| 2002/0121191 A1 | * 9/2002 | Warren .......................... | 95/11 |
| 2003/0188635 A1 | * 10/2003 | Lomax et al. ................. | 95/96 |

FOREIGN PATENT DOCUMENTS

FR  2550466 A1 * 2/1985
GB  2232364 A  * 12/1990

* cited by examiner

Primary Examiner—Robert H. Spitzer
(74) Attorney, Agent, or Firm—Douglas E. Jackson; Stites & Harbison, PLLC

(57) ABSTRACT

An adsorption gas dryer has a first drying tower and a second drying tower each having a first port and a second port through which gas can pass into or out of the tower, a first manifold and a second manifold connected respectively to the first and the second ports of both towers, the manifolds each including integral gas passages, each port of the towers being in communication with a gas passage, and the manifolds each including at least one integral valve seat upon which a valve actuator is mounted to constitute a valve for controlling flow of gas through the gas passages, wherein the second manifold has two exhaust valves for controlling purge gas.

13 Claims, 4 Drawing Sheets

ADSORPTION GAS DRYER

BACKGROUND OF THE INVENTION

Adsorption dryers for compressed air and gases have been known for many years and are widely used throughout the world. Although other types of dryer are available, such as deliquescent and refrigeration dryers, these cannot give a pressure dew-point as low as that achieved by adsorption dryers and which is essential for many applications.

Normally, adsorption dryers are dual tower dryers. That is to say, they include two towers of desiccant material (commonly known as beds) one of which is 'on stream' drying the gas whilst the other is being regenerated. In a dual tower dryer, the gas to be dried is passed through the desiccant bed of the on-stream tower continuously, in one direction, during a drying cycle. Then, after a predetermined time interval (this interval being chosen such that the bed will have adsorbed sufficient moisture) the inlet gas is switched to the desiccant bed of the other tower and the first desiccant bed is regenerated by some suitable procedure such as heating, evacuation or passing a purge gas through it, usually in a flow direction opposite to the flow of gas to be dried.

Adsorption dryers are available in at least two distinct types: heat regenerative and heatless. A heat regenerative dryer, as the name implies, uses heat in one form or another to reactivate the wet desiccant bed normally in conjunction with a flow of purge gas. A heatless dryer uses a purge flow of dry gas, which is usually a proportion of dried gas from the on-stream tower, the purge gas being passed through the regenerating bed at a lower pressure than the gas in the on-stream tower. Both types of dryer are normally operated on a fixed time cycle for drying and regeneration and both cycles are usually of an equal duration, or they can be operated in a variable cycle. The cycle times for heat regenerative dryers are usually measured in hours whereas for heatless dryers they are measured in minutes.

To control the flow of gas from one tower to the other, and to control the purge gas, a series of valves is employed. These valves most typically include inlet valves which switch the gas from one tower to the other, exhaust valves which control the duration of purge gas flow and repressurisation of the towers, and outlet check valves which prevent the outlet stream pressurizing the off-stream bed. In addition to these valves, a number of other valves such as purge check valves, repressurisation valves, additional exhaust restrictor valves and so forth may be required.

SUMMARY OF THE INVENTION

In the vast majority of cases, manufacturers of adsorption gas dryers have usually sourced commercially available valves and piped them together using butt weld or threaded malleable iron fittings. A number of problems exist with dryers having this style of construction including pressure drop through the individual fittings, leakage through threaded joints, inflexibility with regard to method of actuation and complex and expensive manufacturing procedures. Some manufacturers have attempted to develop manifold systems but these have been limited to using porting blocks made from bar stock attached to butt welded pipework.

In the applicant's earlier application, EP 0960646, there is disclosed a dryer having a first and a second manifold for connection to the towers, each manifold having integral gas passages and at least one integral valve seat upon which a valve actuator is mounted. Such a drier is shown in FIG. 1 in which there is provided two desiccant towers, 1 and 2 which each have an upper and lower port. A first manifold, 3, is connected to the two upper ports whilst a second manifold, 4, is connected to the two lower ports. Each manifold had four valves arranged in a linear formation within the manifold. This leads to a fairly bulky formation It is an aim of the present invention to reduce the problems associated with the known dryers.

According to the invention there is provided an adsorption dryer having a first and a second drying tower each having a first port and a second port through which gas can pass into or out of the tower, a first and a second manifold connected respectively to the first and the second ports of both towers, the manifolds each including integral gas passages, each port of the towers being in communication with a gas passage, and the manifolds each including at least one integral valve seat upon which a valve actuator is mounted to constitute a valve for controlling flow of gas through the gas passages wherein the second manifold has two exhaust valves for controlling purge gas.

In a dryer embodying the invention, the number of joints is minimised so improving reliability and reducing leakage and the complexity of assembly. Furthermore, the passages within the manifold can be formed to a length and shape, and the valve seats can be positioned to exactly correspond with the positions of the towers, unlike in the prior art where the positions of the pipes is determined by the positions of the valve ports.

Preferably, the exhaust valves are arranged adjacent each other in the second manifold. By arranging the two exhaust valves side by side in the second manifold, a smaller, more compact structure can be achieved.

Each manifold may be formed as a casting, for example of aluminium alloy, spheroidal graphite iron, or plastic material such as polycarbonate.

Most typically, one manifold (the second manifold) acts as a wet gas inlet and the other manifold (the first manifold) as the dry gas outlet.

Preferably, the casting for each manifold is identical as this will reduce manufacturing costs. In embodiments where the castings are identical, the position in the cast occupied by the exhaust valves in the second manifold is left vacant in the first manifold i.e. two cavities with no valve actuator are present in the first manifold. Preferably, these two cavities will be joined by a gas passage through which purge gas can flow. This purge gas will be dry gas which is bled off from the dry gas flowing to the outlet. Preferably, the first manifold has an aperture which provides an exit from the purge gas passage way to the exterior of the manifold. This aperture will be blocked off to ensure that the purge gas does not exit the manifold via the aperture. The aperture is preferably blocked off using a restriction element that restricts the flow of purge gas by a predetermined amount. For example, the restriction element may have an orifice of a smaller diameter than the purge gas passage. In this way, the restriction element may easily be replaced to vary the purge gas flow without requiring any disconnection of the manifold.

A dryer embodying the present invention most commonly comprises two similar towers, each having an upper and a lower port, and upper and lower manifolds, the upper manifold being connected to the upper ports of both of the towers and the lower manifold being connected to the lower ports of both of the towers. Preferably, the first manifold is the upper manifold and the second manifold is the lower manifold but this could be reversed.

A dryer embodying the invention may be heatless or heat reactivated, up flow or down flow types of adsorption dryers.

Conventionally, separate control enclosures are provided which add to cost and to size and can lead to problems with electrical protection from ingress of moisture and dust. A control system for a dryer embodying the invention may be positioned within or on a manifold.

Hitherto, valves have been attached through pipework to the towers by means of screwed unions or gaskets. These are difficult to seal and are prone to subsequent leakage. More advantageously, embodiments of the present invention may use O-rings located in nozzles of the towers to provide seals with the manifolds. These O-rings serve two purposes in that they not only provide compound sealing between the manifold and the vessel towers, but that they also captively hold desiccant support screens in place in the towers so that the manifolds can be removed from the towers without fear that the desiccant beads will fall out of the towers, thus making maintenance a much simpler task.

Embodiments of the invention can incorporate, for example, poppet or piston actuated valves or diaphragm valves.

Preferably, the exhaust valves are diaphragm valves. Most preferably, they are servo-controlled diaphragm valves. In preferred embodiments, the second manifold includes a shuttle valve to direct wet gas into the appropriate i.e. on-stream tower. This shuttle valve "shuttles" between two positions, and the movement is preferably controlled by the exhaust valves.

At least one of the manifolds preferably includes a "demand" valve that comprises a spring-loaded piston. Gas will meet the piston and, only when the gas pressure is sufficient, the spring will be compressed and the piston moved in the direction of the gas flow to allow it to enter a gas passage revealed only when the piston is depressed. This ensures that the pressure within the dryer is adequate as it will not function if the pressure is too low.

In a second aspect there is provided a connection block for connection to a manifold as described above, the connection block comprising two sets of gas passages, each set forming a cruciform shape within the block, each set having up to three arms of the cruciform leading to an exit from the block, whilst the fourth arm of one set forms an inlet into the manifold and the fourth arm of the other set forms an outlet from the manifold.

This connection block allows multiple inlet/outlet options. For example, if each set of cruciform gas passages has three outlets from the block, there are nine possible options. When driers are to be connected in a confined space, the option of connecting gas pipes to numerous locations is beneficial. It also allows driers to be connected together e.g. face to face in a space efficient manner. Furthermore, it allows all other drier components to be disconnected, e.g. desiccant towers, control valve panels, leaving the cruciform connection block connected to the pipes and leaving the pipe system undisturbed.

As well as providing exits from up to three arms of the cruciform gas passages in each set, there may also be further exits from the gas passages, e.g. by other gas passages leading to the exterior of the block branching off from the cruciform passages. For example, there may be a passage running perpendicularly to the plane in which the cruciform gas passages run.

In a third aspect, there is provided a drier according to the first aspect in combination with a cruciform connection block according to the second aspect.

DESCRIPTION OF THE PREFERRED EMBODIMENTS

Figure 1:
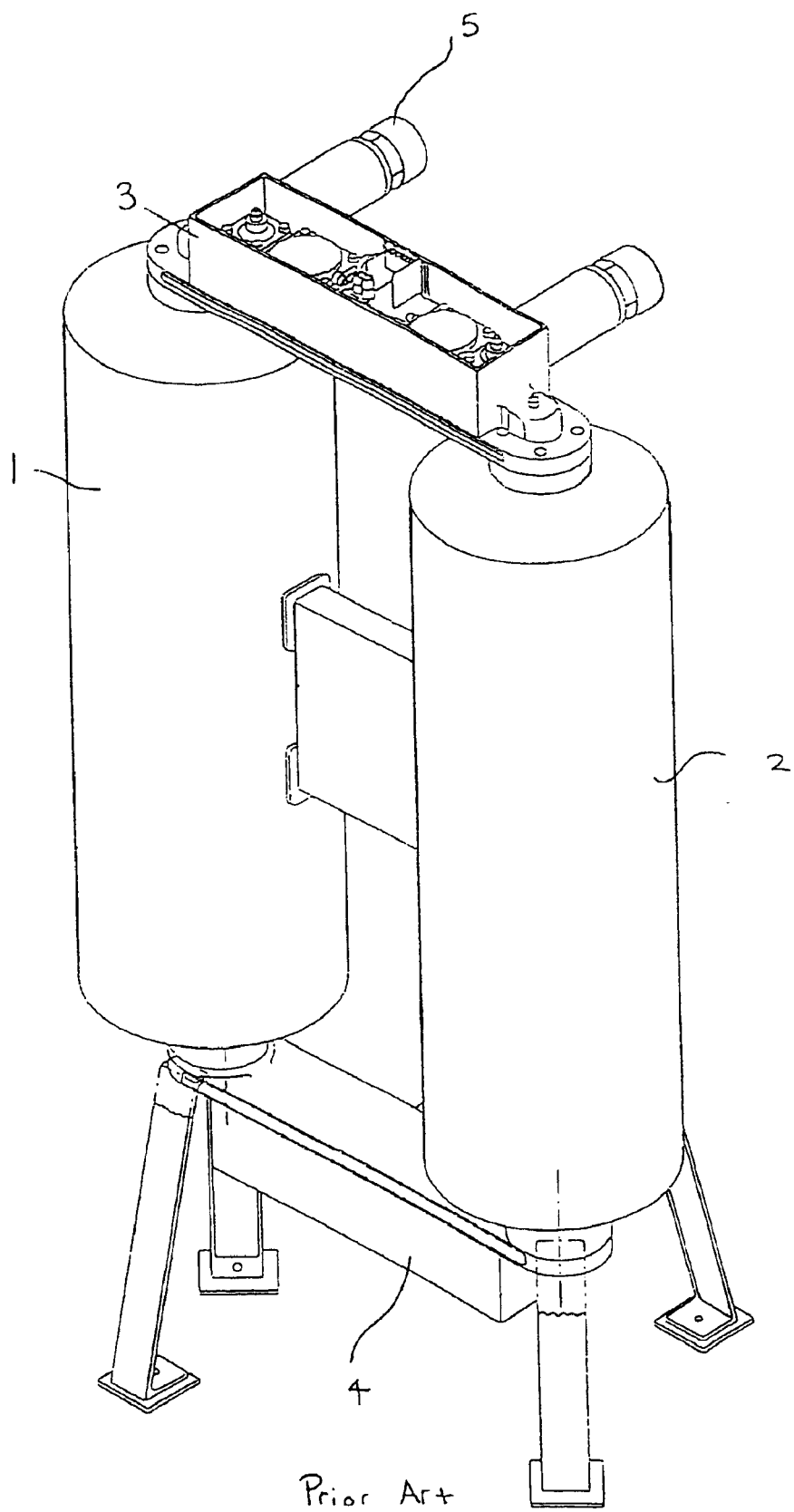
FIG. 1 shows a known adsorption gas dryer.

FIG. 1 shows a prior art dryer. The dryer comprises first and second drying towers 1, 2 containing desiccant material. The towers 1,2 are generally cylindrical and are disposed in an upright orientation.

Gas to be dried is received by an inlet pipe 5 from where it is conveyed to the towers 1,2 through an inlet system of pipes and valves contained within a manifold 3 mounted on the towers 1,2.

Gas exiting from the towers 1,2 is received by an outlet system of pipes and valves contained within manifold 4 mounted below the towers 1,2.

Figure 2:
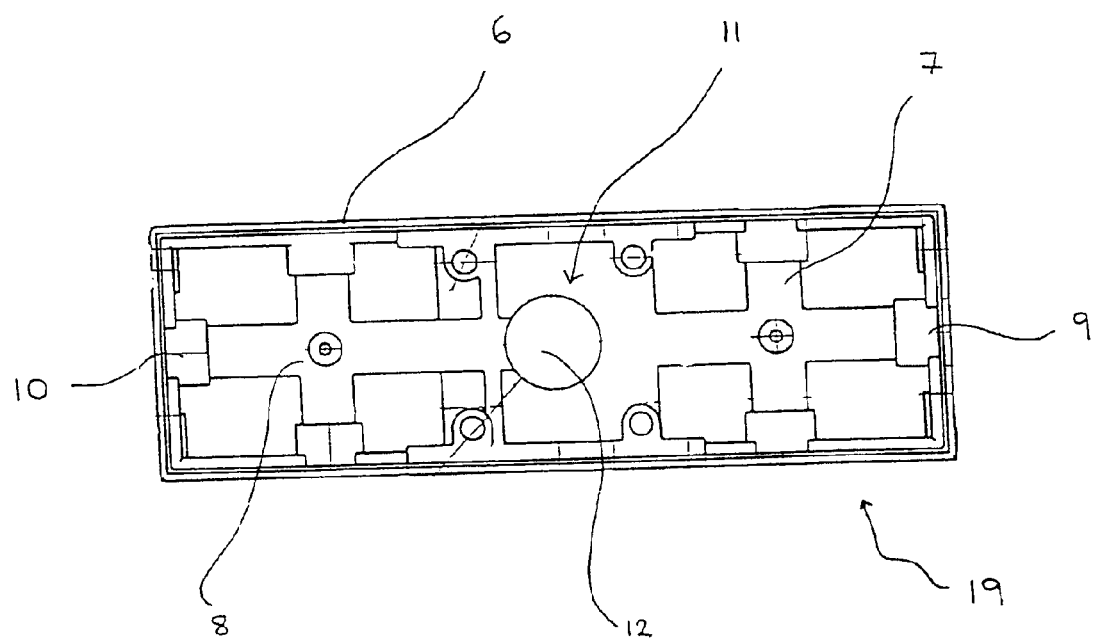
FIG. 2 shows a cruciform connection block which is an embodiment of the second aspect of the present invention.

A preferred embodiment of the connection block according to the second aspect of the present invention is shown in FIG. 2 as a plan view.

The connection block includes a body 6 which is preferably of a rectangular shape. Inside the block is a first set of cruciform gas passages 7 and a second set of cruciform gas passages 8. Each set of passages has three exits from the block, one at the end of three arms of the cruciform. Accordingly, the rectangular block has one aperture 9, 10 at each end of the block (on the two short sides of the rectangle) and two apertures on each long side of the rectangle, six apertures in total.

The connection block shown in FIG. 2 is for connection to a manifold. The connection block has an inlet 11 to the manifold and an outlet 12 from the manifold. Gas can enter the connection block through any of the apertures associated with the set of cruciform gas passages that lead to the inlet 11. For example, gas could enter via aperture 9 and flow in a straight path to the inlet 11 which is in fluid combination with a gas passage in the manifold. Once the gas has been dried, it exits the manifold at outlet 12 and enters the connection block. Gas can then leave the connection block by any one of the three apertures associated with the cruciform gas passages in fluid communication with the outlet, e.g. aperture 10.

The inlet and outlet to and from the manifold can be reversed.

Figure 3:
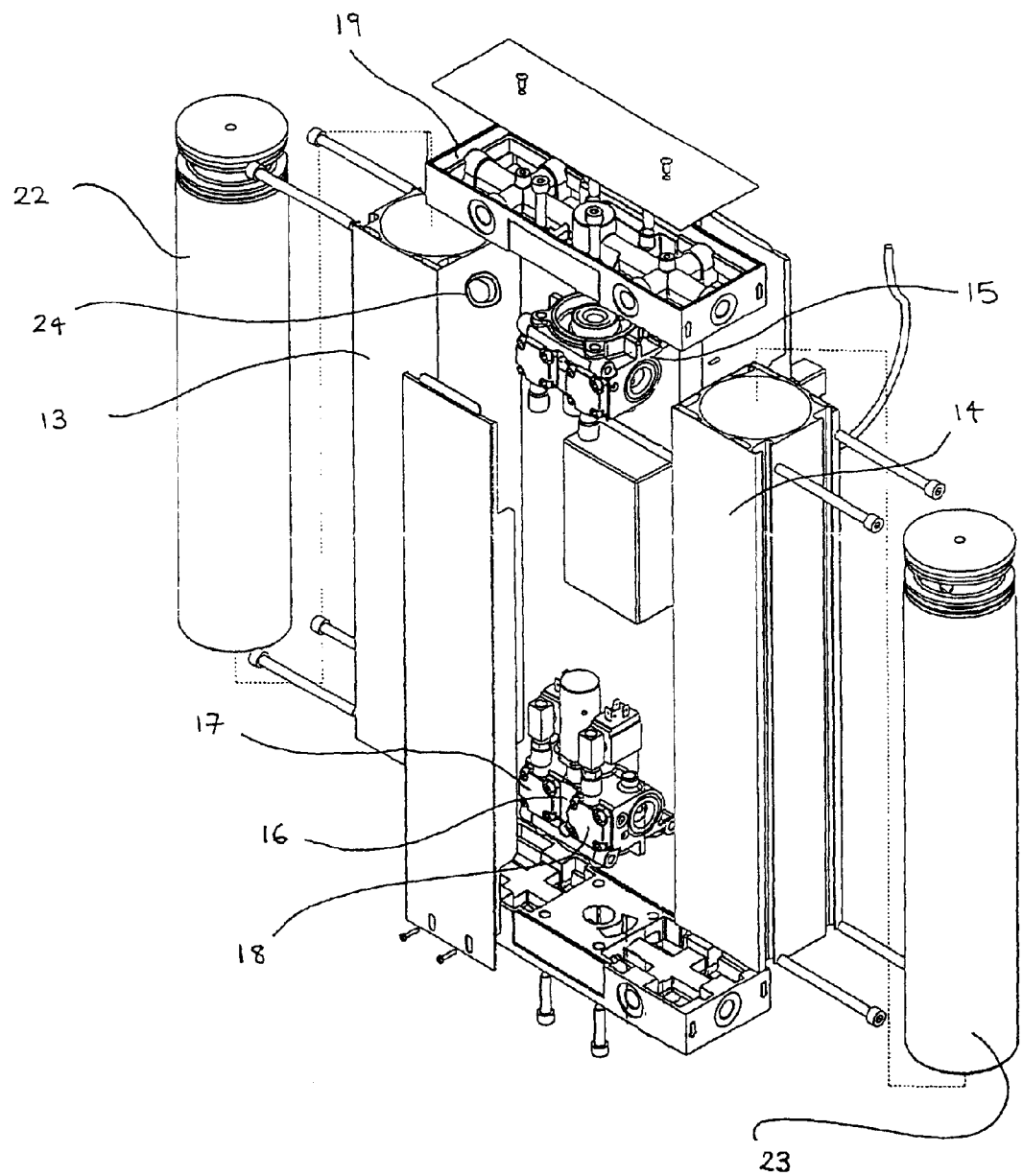
FIG. 3 shows an adsorption dryer which is an embodiment of the invention.

A preferred embodiment of the dryer according to the first aspect of the present invention is shown in FIG. 3. For the purposes of this description, a heatless down-flow dryer is used as an example. However, it will be realized that the invention is not restricted in application to dryers of this type.

With reference now to FIG. 3, a dryer embodying the invention comprises first and second drying towers 13,14, each containing desiccant material. The desiccant material may be constrained only by the tower but preferably, cartridges 22,23 of desiccant material are inserted into the towers 13,14. The cartridges 22,23 are generally cylindrical and the towers 13,14 are disposed in an upright orientation. Each tower 13,14, has an upper port 24 and a lower port, through which gas can pass into and out of the tower.

A first manifold 15 is connected to the upper ports of both towers and a second manifold 16 is connected to the lower ports of both towers.

The two manifolds are constructed as identical castings. Various materials can be used for the casting ranging from aluminium alloys to spheroidal graphite iron to polycarbonate composite plastics.

In the second manifold 16, there are two exhaust valves 17, 18 located adjacent each other. Preferably, the exhaust valve actuators include a diaphragm under a cap which is sealed against a first sealing surface and which can be urged against a second sealing surface to close the port connected thereto. The diaphragm may be operated by a solenoid or under pneumatic control, as is convenient, or it may be self-actuating. Each exhaust valve must be sufficiently large to allow a desiccant tower to reduce from full line pressure to atmospheric pressure in a matter of seconds.

The first manifold does not have exhaust valves but, as both manifolds are identical in moulded structure, there are cavities within the manifold in place of the valve actuators. These cavities are blanked off so that gas cannot escape from the manifold but there is a passage passing between the two cavities through which purge gas channeled from the outlet stream of dry gas can pass. It is desirable to be able to control the flow of purge gas and this can be done using a restriction element which is inserted through an aperture in the manifold wall. This allows for easy removal of the restriction element for replacement by an alternative element with different flow characteristics. Thus purge flow can be controlled without the manifold being dismantled.

Both manifolds have a valve, preferably at the heart of the manifold. This is preferably a shuttle valve which has an actuator that can "shuttle" between two positions thus controlling the passage of gas.

The drier also preferably includes a connection block 19 which is identical to that shown in FIG. 2. The connection block is seated on the manifold and provides an inlet and outlet into the manifold.

Figure 4:
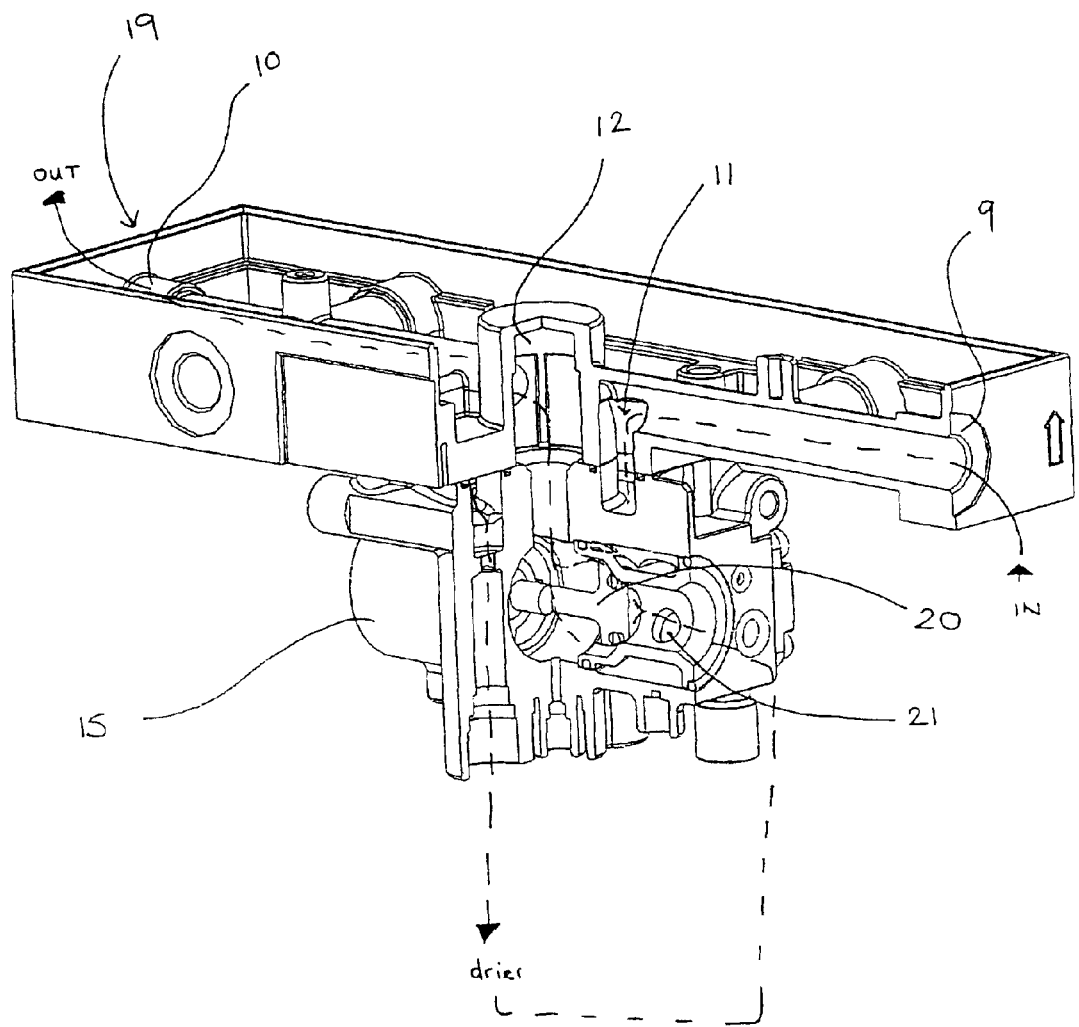
FIG. 4 is a cross-section through a connection block and a manifold according to a preferred embodiment of the present invention.

In operation, suppose initially that the first tower 13 is being used to dry the incoming gas and the second tower 14 is being regenerated having been saturated in the preceding drying cycle. Gas enters the connection block via aperture 9 and flows through the gas passage to the inlet 11 to the manifold 15 as shown in FIG. 4. Alternatively, there could be a conventional inlet pipe connected to the manifold. The wet gas is then directed to the second manifold at the base of the towers. The shuttle valve in the second manifold would be positioned so as to direct the incoming gas stream into the first tower 13. The gas flows through the tower back to the first manifold where it meets a second shuttle valve 20 which will be positioned so as to allow flow of the gas to the outlet 12 and then out of the manifold into the gas passages of the connection block.

A demand valve can be located at outlet 12 comprising a piston and a spring. If the gas pressure is below a predetermined threshold, the force of the gas is insufficient to depress the spring and the piston remains in a position in which the exit to the connection block (or other outlet pipe) is concealed. When the gas pressure reaches the threshold, the spring is compressed and the piston moves in the direction of the gas flow, revealing the exit to the connection block as it moves so that the gas can exit the manifold.

As the dry gas flows back into the first manifold from the on-stream tower, a small bleed of this dry gas is channeled off into a purge gas passage through an aperture 21. This gas passage passes between the space left by omission of the exchange valves from the first manifold. As discussed previously, the flow of purge gas in the passage can be controlled by replaceable restriction elements. The purge gas expands as it passes through orifices in the gas passageway so that on entry into a tower, it is substantially at atmospheric pressure. This purge gas is channeled back down to the second manifold through the off-stream tower 14 thus regenerating the desiccant. The purge gas exits the tower into the second manifold where it is exhausted from the drier by one of the exhaust valves. The action of the gas passing through the exhaust valve is responsible for the control of the shuttle valve in the second manifold. If gas is being exhausted from tower 14, then the shuttle valve is switched to ensure that wet gas yet to be dried is channeled into the tower 13.

The preferred embodiments described above are by way of example only and many modifications will be readily apparent to a person skilled in the art.

We claim:

1. An adsorption gas dryer having a first drying tower and a second drying tower, each having a first port and a second port through which gas can pass into or out of the tower, a first manifold and a second manifold connected respectively to the first and the second ports of both towers, the manifolds each including integral gas passages, each port of the towers being in communication with a gas passage, and the manifolds each including at least one integral valve seat upon which a valve actuator is mounted to constitute a valve for controlling flow of gas through the gas passages wherein the second manifold has two exhaust valves for controlling purge gas;

wherein each manifold is formed as an identical casting; and wherein the position in the casting occupied by the exhaust valves in the second manifold is left vacant in the first manifold.

2. An adsorption gas dryer as claimed in claim 1 in which the exhaust valves are arranged adjacent each other in the second manifold.

3. An adsorption gas dryer as claimed in claim 1 in which the second manifold acts as a wet gas inlet and the first manifold acts as the dry gas outlet.

4. An adsorption gas dryer as claimed in claim 3 in which two cavities with no valves therein are present in the first manifold, these two cavities being joined by a gas passage through which purge gas can flow.

5. An adsorption gas dryer as claimed in claim 4 which the first manifold has an aperture which provides an exit from the purge gas passage to the exterior of the manifold, this aperture being blocked off to ensure that the purge gas does not exit the manifold via the aperture.

6. An adsorption gas dryer as claimed in claim 5 in which the aperture is blocked off using a restriction element that restricts the flow of purge gas by a predetermined amount.

7. An adsorption gas dryer as claimed in claim 1, wherein said first and second drying towers are similar, each having an upper said first port and a lower said second port, and an upper said first manifold and a lower said second manifold, the upper first manifold being connected to the upper first ports of both of the first and second towers and the lower second manifold being connected to the lower second ports of both of the first and second towers.

8. An adsorption gas dryer as claimed in claim 1 in which O-rings are located in nozzles of the towers to provide seals with the manifolds.

9. An adsorption gas dryer as claimed in claim 1 in which the exhaust valves are servo-controlled diaphragm valves.

10. An adsorption gas dryer as claimed in claim 9 in which the second manifold includes a shuttle valve to direct wet gas into the on-stream tower, the movement of the shuttle valve being controlled by the exhaust valves.

11. An adsorption gas dryer as claimed in claim 1 in which at least one of the manifolds includes a demand valve that comprises a spring-loaded piston, such that, only when the gas pressure is sufficient, the spring is compressed and the piston is moved in the direction of the gas flow to allow it to enter a gas passage revealed only when the piston is depressed.

12. A connection block for connection to the first or to the second manifold of an adsorption gas dryer as claimed in claim 1, the connection block comprising two sets of gas passages, each set forming a cruciform shape having four arms within the block, each set having up to three arms of the cruciform shape leading to an exit from the block, whilst a fourth arm of the cruciform shape of one set forms an inlet into the first or second manifold and a fourth arm of the other set forms an outlet from the first or second manifold.

13. A connection block as claimed in claim 12 and including additional gas passages leading to the exterior of the block branching off from the cruciform passages.

* * * * *